(12) United States Patent
Chang et al.

(10) Patent No.: US 7,980,144 B2
(45) Date of Patent: Jul. 19, 2011

(54) FLEXIBLE ELECTRONICS FOR PRESSURE DEVICE AND FABRICATION METHOD THEREOF

(75) Inventors: Wen-Yang Chang, Yunlin County (TW); Heng-Ju Lin, Tainan (TW); Yu-Tang Shen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 163 days.

(21) Appl. No.: 12/412,346

(22) Filed: Mar. 26, 2009

(65) Prior Publication Data

US 2010/0090299 A1    Apr. 15, 2010

(30) Foreign Application Priority Data

Oct. 15, 2008    (TW) ................ 97139528 A (51) Int. Cl.
*G01L 1/26* (2006.01)
(52) U.S. Cl. .................. 73/862.392; 73/760
(58) Field of Classification Search ......... 73/862.381–862.392, 760–860
See application file for complete search history.

(56) References Cited

U.S. PATENT DOCUMENTS

| | | | |
|---|---|---|---|
| 5,623,293 A * | 4/1997 | Aoki | 347/56 |
| 6,032,542 A | 3/2000 | Warnick et al. | |
| 6,586,738 B2 * | 7/2003 | Dausch et al. | 250/338.3 |
| 7,002,225 B2 * | 2/2006 | Stewart | 257/414 |
| 7,012,187 B2 | 3/2006 | Aldridge | |
| 7,258,026 B2 | 8/2007 | Papakostas et al. | |
| 2006/0098290 A1 * | 5/2006 | Fernando et al. | 359/609 |
| 2007/0182787 A1 * | 8/2007 | Kubo et al. | 347/58 |

* cited by examiner

*Primary Examiner* — Max Noori
(74) *Attorney, Agent, or Firm* — Jiang Chyun IP Office (57) ABSTRACT

A pressure device of flexible electronics capable for sensing a large area includes flexible films, electrodes, sensing blocks, and bumps. The flexible films are disposed with intervals and define two spaces. The electrodes and the sensing blocks are disposed on the flexible films and are in a space. The bumps are disposed on the flexible films and are in another space. The air in the spaces maintains a buffer distance of each two adjacent flexible films with the electrodes and the sensing blocks. When the pressure device of flexible electronics is deformed, it is capable of avoiding erroneous signals caused by contact of the sensing block and the electrode or the two sensing blocks disposed on the different flexible films respectively.

20 Claims, 10 Drawing Sheets

FLEXIBLE ELECTRONICS FOR PRESSURE DEVICE AND FABRICATION METHOD THEREOF

CROSS-REFERENCE TO RELATED APPLICATION

This application claims the priority benefit of Taiwan application serial no. 97139528, filed on Oct. 15, 2008. The entirety of the above-mentioned patent application is hereby incorporated by reference herein and made a part of specification.

BACKGROUND

1. Technical Field

The disclosure relates to a pressure device of flexible electronics and a fabrication method thereof. More particularly, the disclosure relates to a pressure device of flexible electronics capable for sensing a large area and a fabrication method thereof.

2. Description of Related Art

The flexible electronics refers to a technique and application of fabricating a functional sensing material on a flexible or bendable substrate. Presently, novel techniques such as plastic electronics, printed electronics, organic electronics, and polymer electronics are applied for designing and fabricating a flexible sensor, and advantages thereof are that such technique applies a printing fabrication process and is suitable for large area.

In general, pressure device is fabricated based on semiconductor or micro-electro-mechanical fabrication processes, and since most of the devices thereon are block rigid structures and are not easy to be bended, it is not suitable for sensing pressure in large area of flexible array. Moreover, the flexible pressure sensor is currently fabricated based on a solid stacking method, so that it is hard to be detected in a dynamic sensing mode, since when the flexible sensor is bended, sensing units thereof are liable to be squeezed by self-deformed substrate films to generate erroneous signals. Therefore, a lot of the current flexible pressure devices can only be operated under a quasi-static environment, and it is hard to be detected under the dynamic behaviours during flexible bending of sensor.

Currently, the static and dynamic pressure devices for large area applications, relatively mature applications thereof are sport protector and electronic pets. A main purpose of the conventional sport protector is to protect an athlete from injury, and to reduce a severe impact during a contact process, and especially during sports activities with intense physical contact between the athletes. Therefore, to improve a judgement correctness of a referee during the sports competitions, the protector integrated with the electronic pressure devices are applied in the competition for contact monitoring of each other. Presently, relatively mature sport protector with electronic pressure is based on inertial mass and inductance, so as to detect the dynamic behaviour of sensor, which is described in a U.S. Pat. No. 7,012,187.

SUMMARY

The present disclosure is directed to a pressure device of flexible electronics, which can reduce erroneous signals due to a self-deformation of the sensing device during a dynamic sensing process after bending.

The present disclosure provides a pressure device of flexible electronics including a first flexible film, a second flexible film, a plurality of first electrodes, a plurality of second electrodes, a plurality of first sensing blocks, a third flexible film, and a plurality of first bumps. The second flexible film is disposed with an interval under the first flexible film, and a first space is formed between the second flexible film and the first flexible film. The first electrodes are disposed on the first flexible film in an array, and are located between the first flexible film and the second flexible film. The second electrodes are disposed on the second flexible film in an array, and are located between the first flexible film and the second flexible film. The first sensing blocks are respectively disposed on the first electrodes and are respectively isolated from the corresponding second electrodes. The third flexible film is disposed with an interval above the first flexible film, and is located farther from the second flexible film compared to that of the first flexible film, and a second space is formed between the third flexible film and the first flexible film, wherein air in the first space and the second space maintains a distance between the first flexible film and the second flexible film. The first bumps respectively correspond to the first sensing blocks, and are disposed on the first flexible film, and are located between the first flexible film and the third flexible film.

In the present disclosure, the air filled in the pressure device of flexible electronics maintains a buffer distance between the films. When the pressure device of flexible electronics is deformed, contact of the sensing block and the electrode or the two sensing blocks disposed on the different flexible films can be avoided. The bumps disposed on the film may lead to a fact that the film has a relatively great deformation amount due to an effect of stress concentration after an external force is applied, so as to improve a sensing sensitivity.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
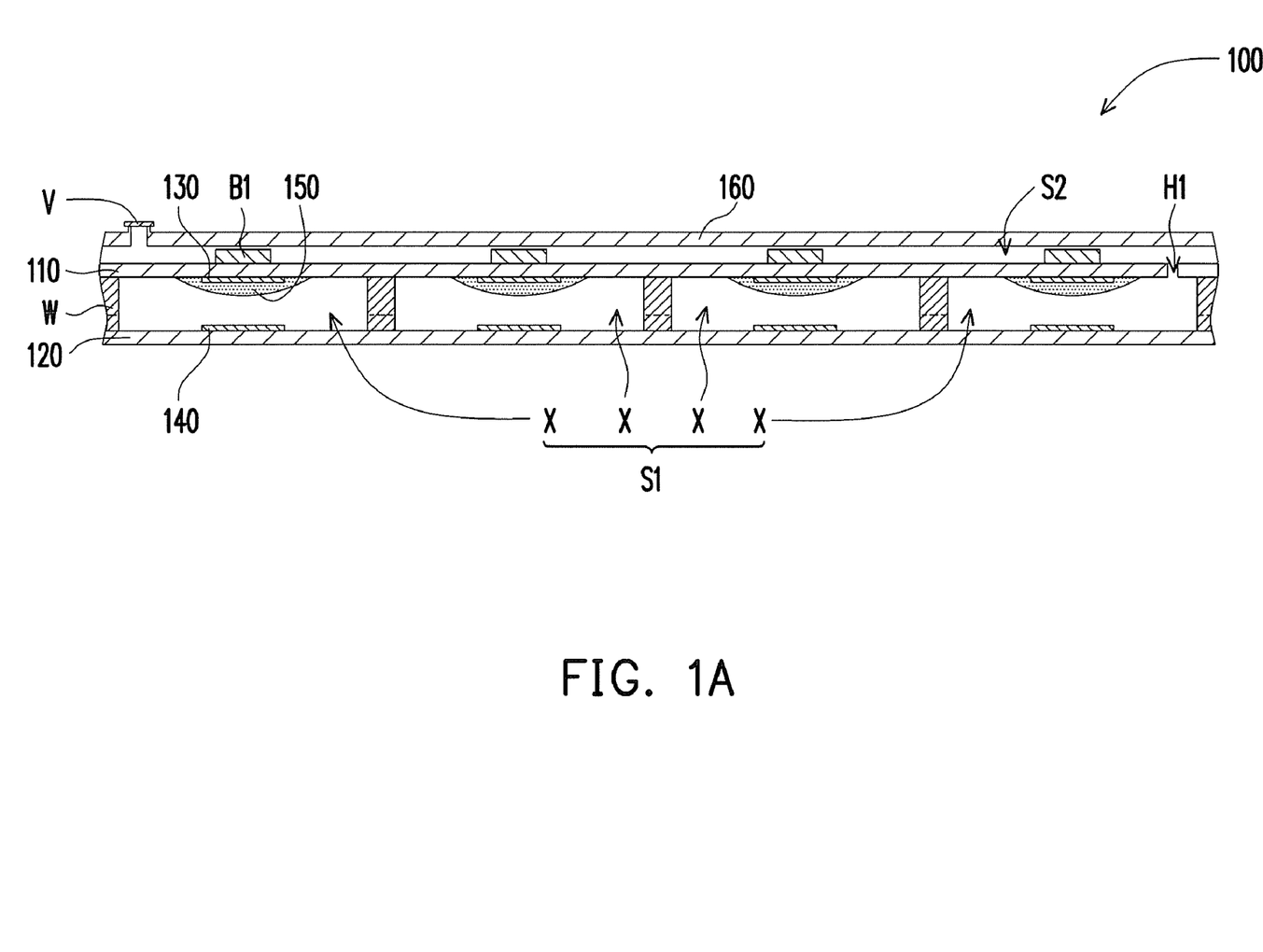
FIG. 1A is a cross-sectional view of a pressure device of flexible electronics in accordance with an embodiment.
Figure 1B:
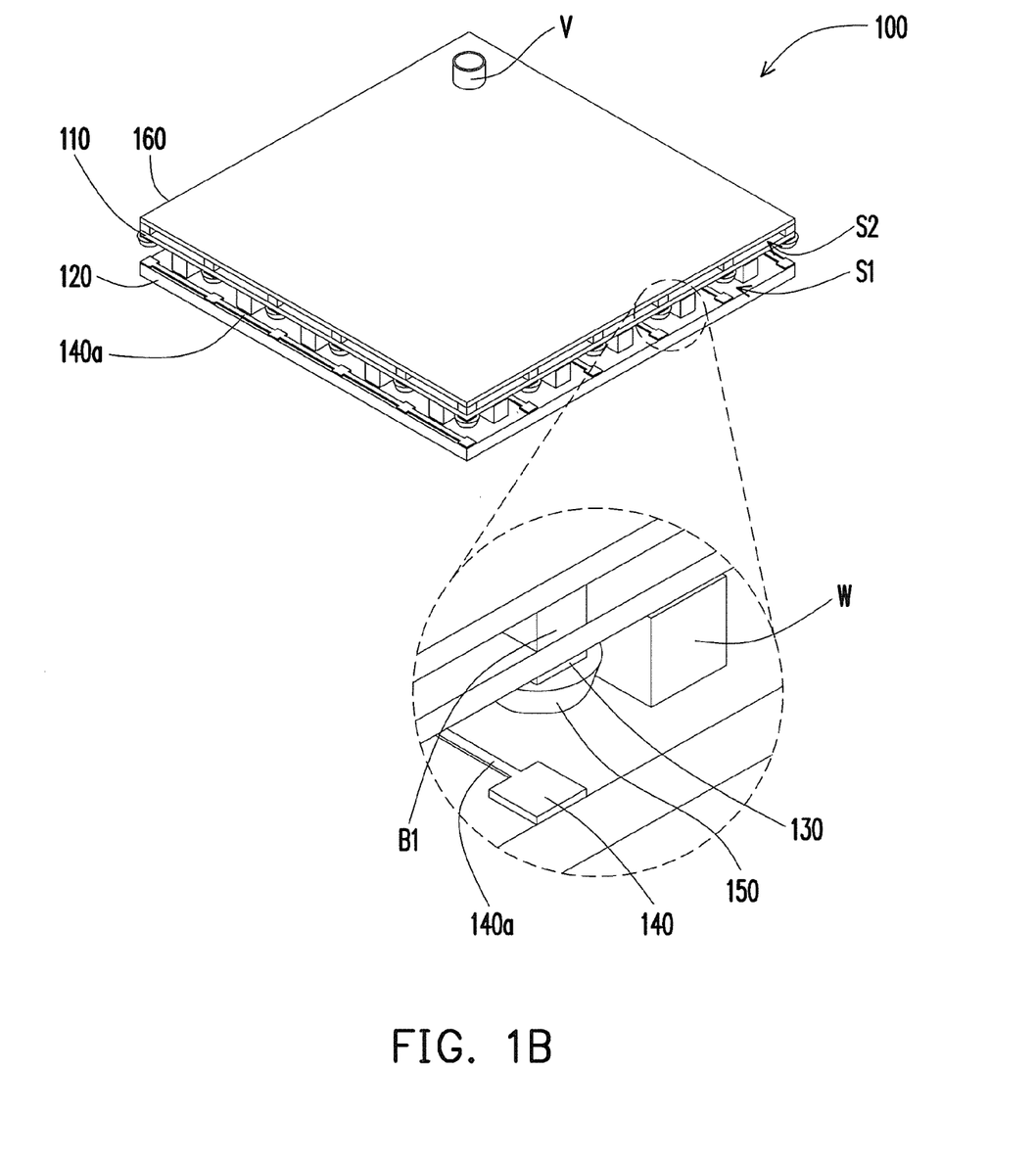
FIG. 1B is a perspective view of the pressure device of flexible electronics of FIG. 1A.
Figure 1C:
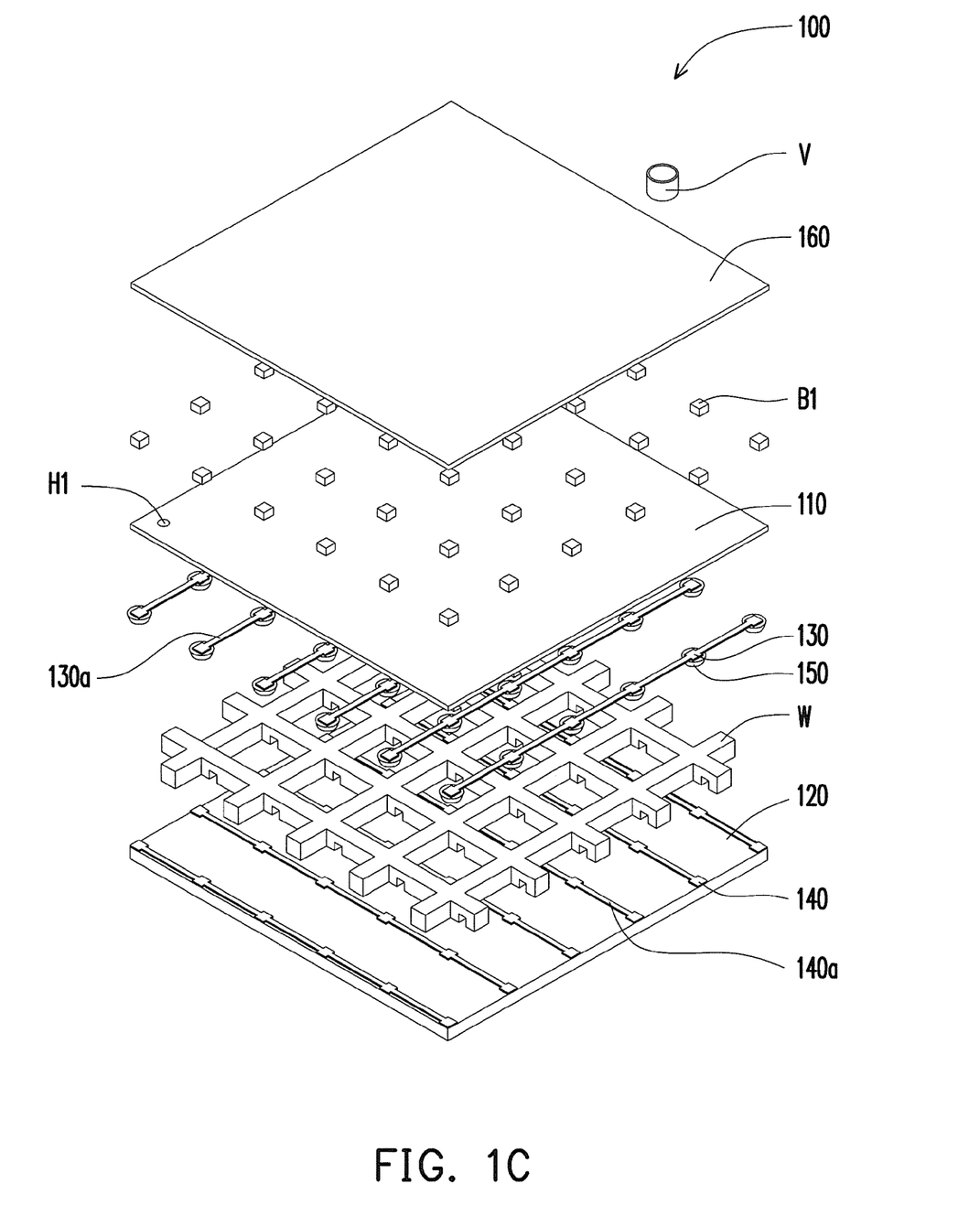
FIG. 1C is an exploded view of the pressure device of flexible electronics of FIG. 1A.

FIG. 1A is a cross-sectional view of a pressure device of flexible electronics according to an embodiment of the present disclosure. FIG. 1B is a perspective view of the pressure device of flexible electronics of FIG. 1A. FIG. 1C is an exploded view of the pressure device of flexible electronics of FIG. 1A. Referring to FIGS. 1A, 1B, and 1C, the pressure device of flexible electronics 100 of the present embodiment includes a first flexible film 110, a second flexible film 120, a plurality of first electrodes 130, a plurality of second electrodes 140, a plurality of first sensing blocks 150, a third flexible film 160 and a plurality of first bumps B1.

The second flexible film 120 is disposed with an interval under the first flexible film 110, and a first space S1 is formed between the second flexible film 120 and the first flexible film 110. The first electrodes 130 are disposed on the first flexible film 110 in an array, and are located between the first flexible film 110 and the second flexible film 120. The second electrodes 140 are disposed on the second flexible film 120 in an array, and are located between the first flexible film 110 and the second flexible film 120. The first sensing blocks 150 are respectively disposed on the first electrodes 130 and are respectively isolated from the corresponding second electrodes 140.

The third flexible film 160 is disposed with an interval above the first flexible film 110, and is located farther from the second flexible film 120 than the first flexible film 110, and a second space S2 is formed between the third flexible film 160 and the first flexible film 110, wherein air in the first space S1 and the second space S2 maintains a distance between the first flexible film 110 and the second flexible film 120. The first bumps B1 respectively correspond to the first sensing blocks 150, and are disposed on the first flexible film 110, and are located between the first flexible film 110 and the third flexible film 160.

When an external force is exerted to the pressure device of flexible electronics 100, the first sensing blocks 150 disposed on the first electrodes 130 and the second electrodes 140 disposed on the second flexible film 120 are mutually contacted due to the squeeze, and accordingly a sensing signal is generated for sensing the pressure. It should be noted that the gap in the first space S1 can maintain a buffer distance between the first sensing blocks 150 and the second electrodes 140 during bending actions. Therefore, when the pressure device of flexible electronics 100 is self-deformed, generation of erroneous signals due to the first sensing blocks 150 are compressed.

Moreover, the bumps B1 disposed on the first flexible film 110 may lead to a fact that the first sensing block 150 of each on the first flexible film 110 has a relatively great deformation amount due to an effect of stress concentration after an external force is applied, so as to increase the sensing sensitivity of the first sensing block 150. In the present embodiment, the material of each of the first sensing blocks 150 is, for example, a resistive material, a piezoresistive material, a piezoelectric material, an inductive material, an electromagnetic material or a thermoelectric material, which is used for sensing the pressure to correspondingly generate the sensing signal.

In the present embodiment, the pressure device of flexible electronics 100 further includes a plurality of walls W, a plurality of first electrode wires 130a and a plurality of second electrode wires 140a. The walls W are disposed between the first flexible film 110 and the second flexible film 120, and are located between any two adjacent first sensing blocks 150, and divides the first space S1 into a plurality mutually connected sub spaces X. Moreover, the first space S1 and the second space S2 are mutually connected via a through hole H1 disposed on the first flexible film 110 to form a confined space, wherein an internal air pressure thereof is substantially greater than one atmospheric pressure. The first electrodes 130 are electrically connected through the first electrode wires 130a, and the second electrodes 140 are electrically connected through the second electrode wires 140a.

In another embodiment, an outer structure formed by the second flexible film 120 and the third flexible film 160 has a valve V. The air can be filled into the confined space formed by the first space S1 and the second space S2 via the valve V, so to maintain the buffer distances among various components within the pressure device of flexible electronics 100. The valve V can be a one-way valve or a two-way valve.

In another embodiment that is not illustrated, the sub spaces X can also be non-connected confined spaces. In still another embodiment that is not illustrated, the first space S1 and the second space S2 are respectively a confined space with internal air pressure thereof being substantially greater than one atmospheric pressure. It should be noted that if the pressure device of flexible electronics 100 has a plurality of non-connected confined spaces, it may have a plurality of corresponding valves V for filling the air into the confined spaces.

To describe a structure of the pressure device of flexible electronics 100 of the present embodiment in detail, a fabrication flowchart of the pressure device of flexible electronics 100 is described with reference of FIG. 2A to FIG. 2C, and FIG. 3A to FIG. 3D.

FIG. 2A to FIG. 2C and FIG. 3A to FIG. 3C are cross-sectional views illustrating a fabrication flowchart of the pressure device of flexible electronics of FIG. 1A. First, referring to FIG. 2A, a first flexible film 110 is provided, and a plurality of first electrodes 130, a plurality of electrode wires 130a (shown in FIG. 1C) connected to the first electrodes 130 and a first through hole H1 are etched according to an screen printing exposure/developing technique. In another embodiment not shown, the first electrodes 130 can be fabricated with a printing process, such as screen printing, inkjet printing, laminating, silk printing, or dispensing.

Figure 2A:
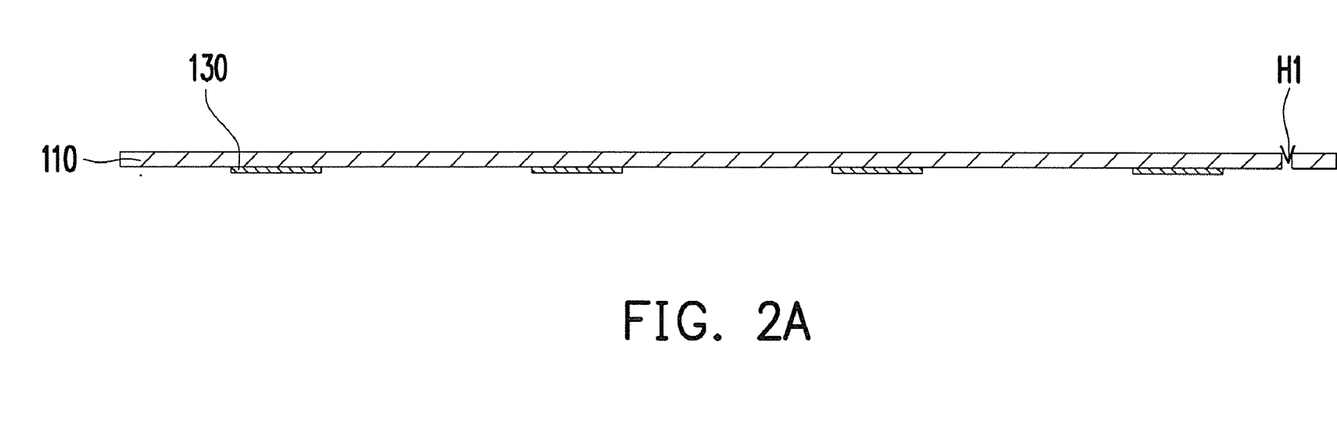
FIG. 2A to FIG. 2C and FIG. 3A to FIG. 3D are cross-sectional views illustrating a fabrication flowchart of the pressure device of flexible electronics of FIG. 1A.
Figure 2B:
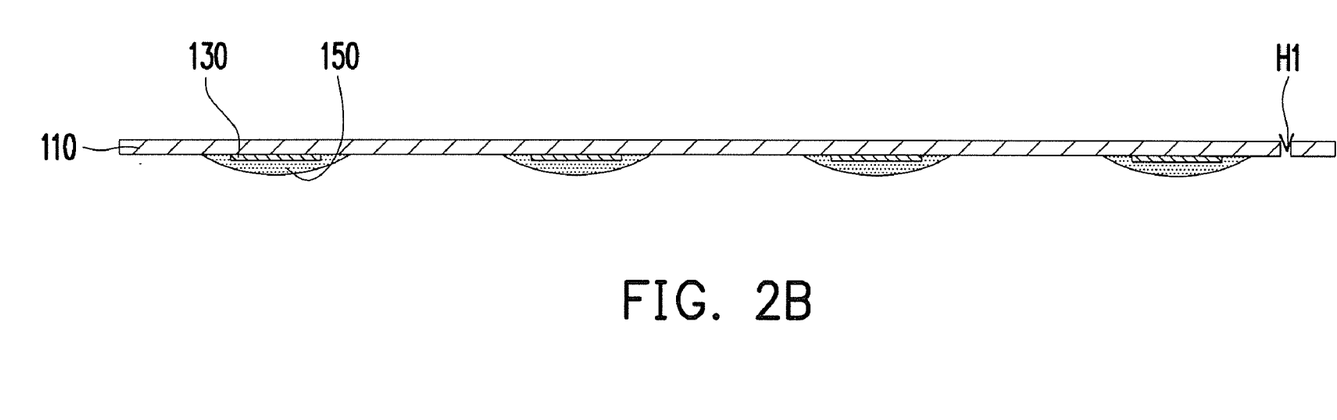

Next, referring to FIG. 2B, a plurality of colloid first sensing blocks 150 is respectively fabricated on each of the first electrodes 130 based on a printing process, such as screen printing, inkjet printing, laminating, silk printing, or dispensing. Next, referring to FIG. 2C, after the first electrodes 130 are cured, the first bumps B1 are formed on the first flexible film 110 based on a printing process, such as screen printing, inkjet printing, laminating, silk printing, or dispensing, wherein the first bumps B1 respectively correspond to each of the first electrodes 130, and are located at a different side of the first flexible film 110 relative to the first electrodes 130.

Figure 3A:
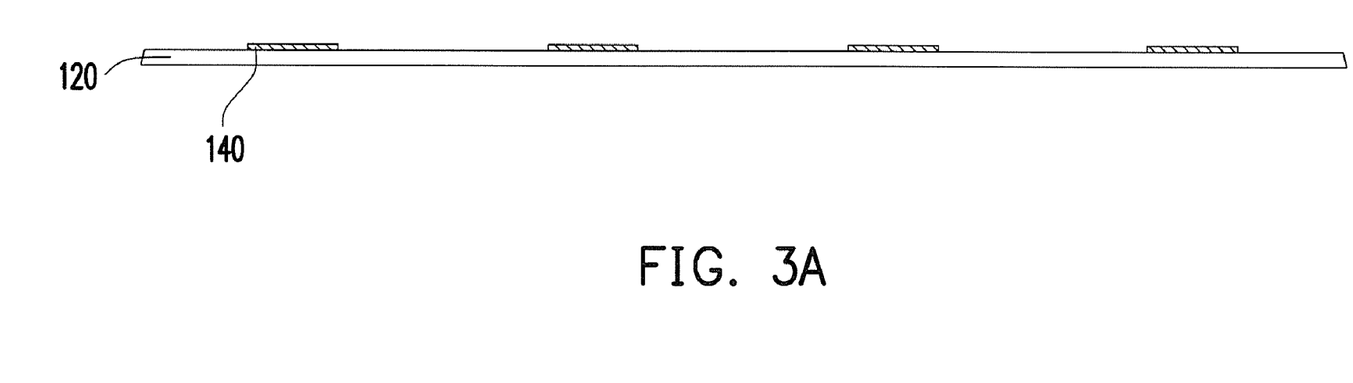

Referring to FIG. 3A, a second flexible film 120 is provided, and a plurality of the second electrodes 140 and a plurality of the second electrode wires 140a (shown in FIG. 1C) connected to the second electrodes 140 are etched on the second flexible film 120 based on the screen printing exposure/developing technique. In another embodiment not shown, the second electrodes 140 can fabricated with a printing process, such as screen printing, inkjet printing, laminating, silk printing, or dispensing.

Figure 3B:
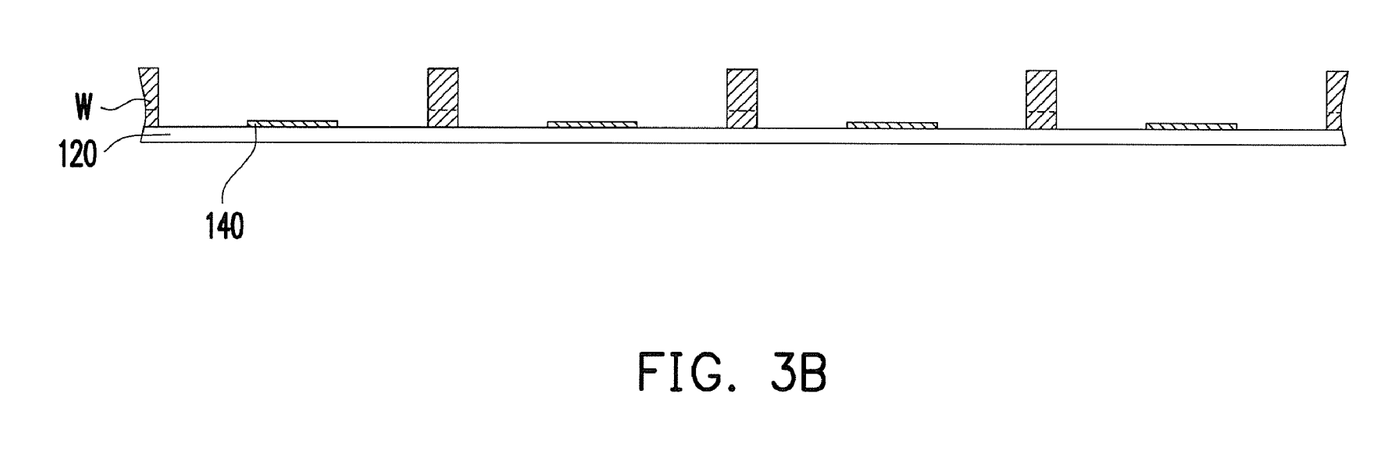

Next, referring to FIG. 3B, a plurality of the walls W are provided, and the walls W are fixed on the second flexible film 120 based on a slice fitting process or a printing process, such as screen printing, inkjet printing, laminating, silk printing, or dispensing. Next, referring to FIG. 3C, a plurality of adhesive materials A is printed on the walls W based on a printing process, such as screen printing, inkjet printing, laminating, silk printing, or dispensing.

Figure 2C:
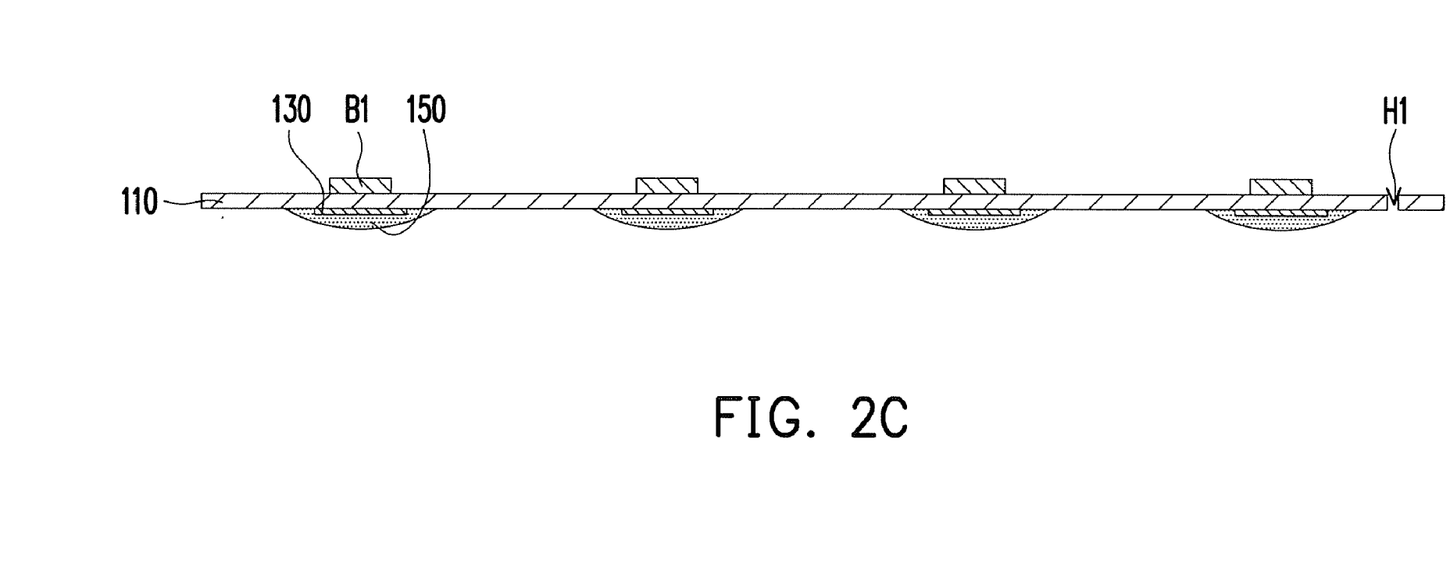
Figure 3C:
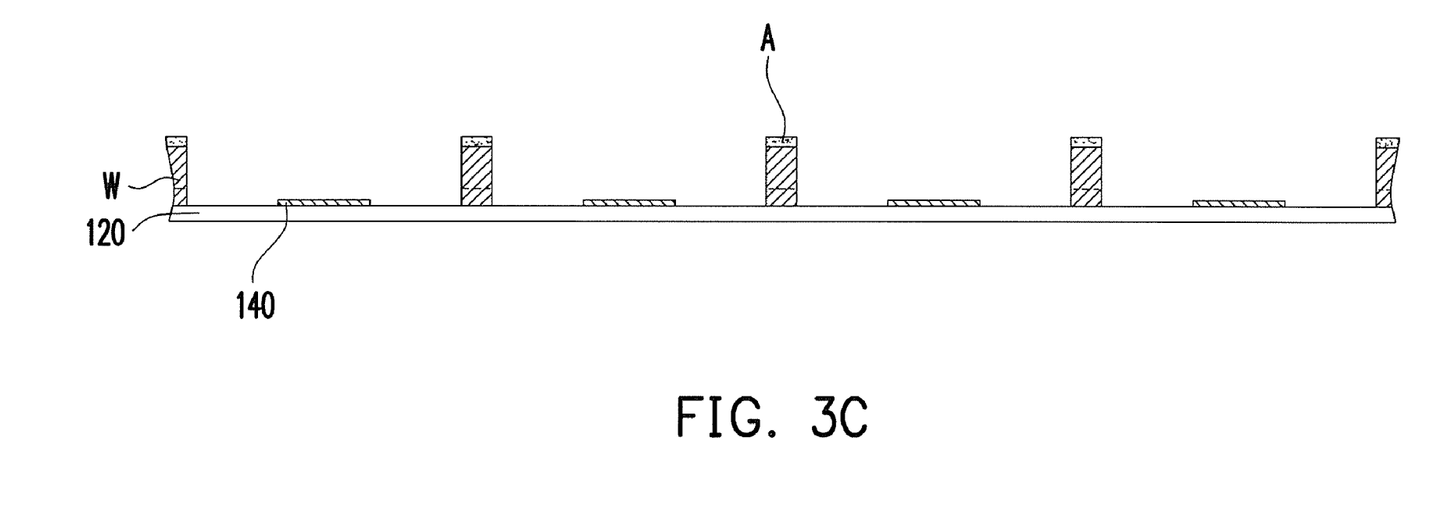
Figure 3D:
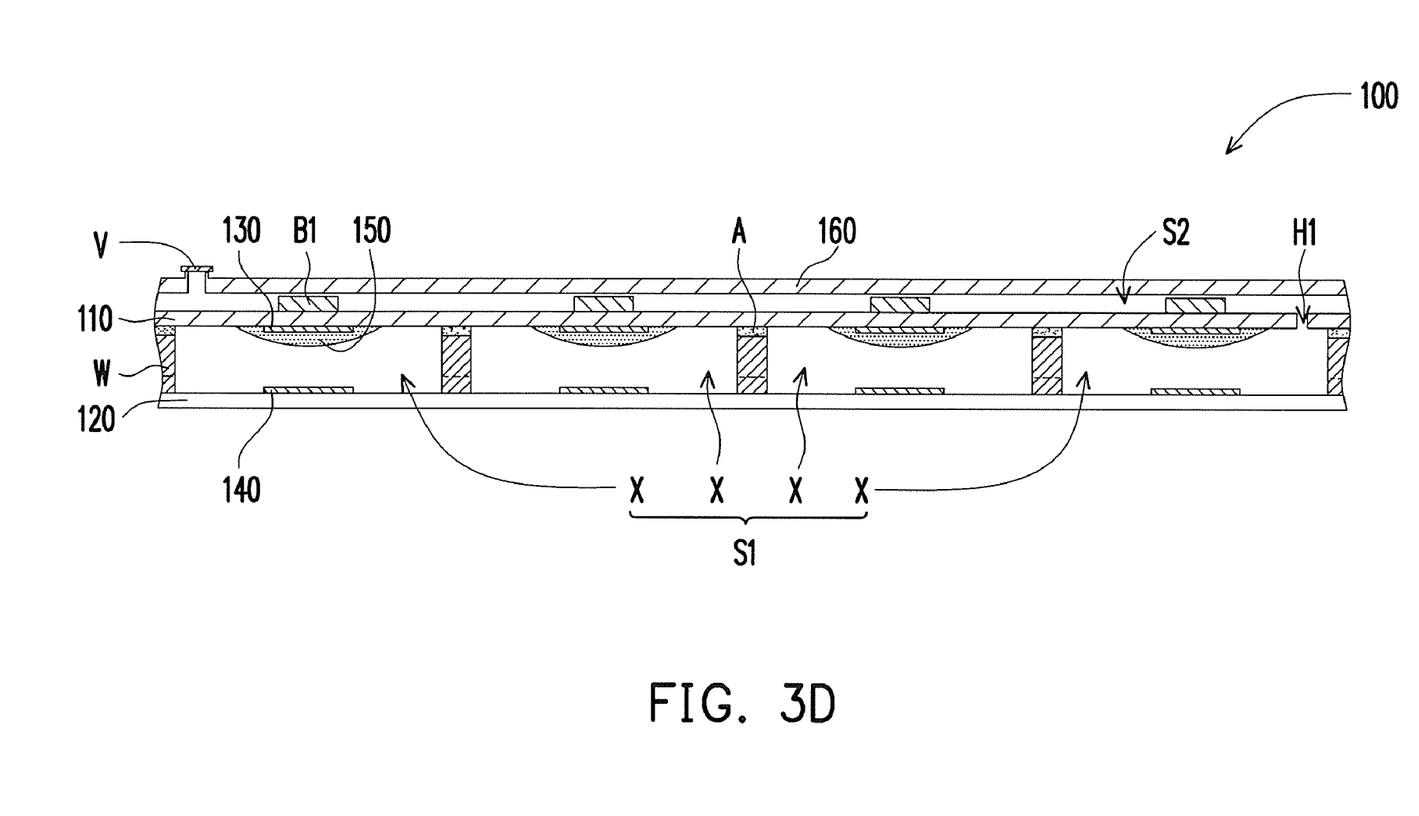

Next, referring to FIG. 3D, the structure of FIG. 3C is assembled to the structure of FIG. 2C via the adhesive materials A, so that the first flexible film 110 and the second flexible film 120 can define the first space S1, and the first electrodes 130, the second electrodes 140 and the first sensing blocks 150 are all located in the first space S1, wherein the walls W define a plurality of the sub spaces X within the first space S1.

Finally, a third flexible film 160 is provided. Then, the valve V is formed on the third flexible film 160, and the third flexible film 160 is assembled to the first flexible film 110 to define the second space S2, so that the first bumps B1 are enclosed in the second space S2.

Figure 4:
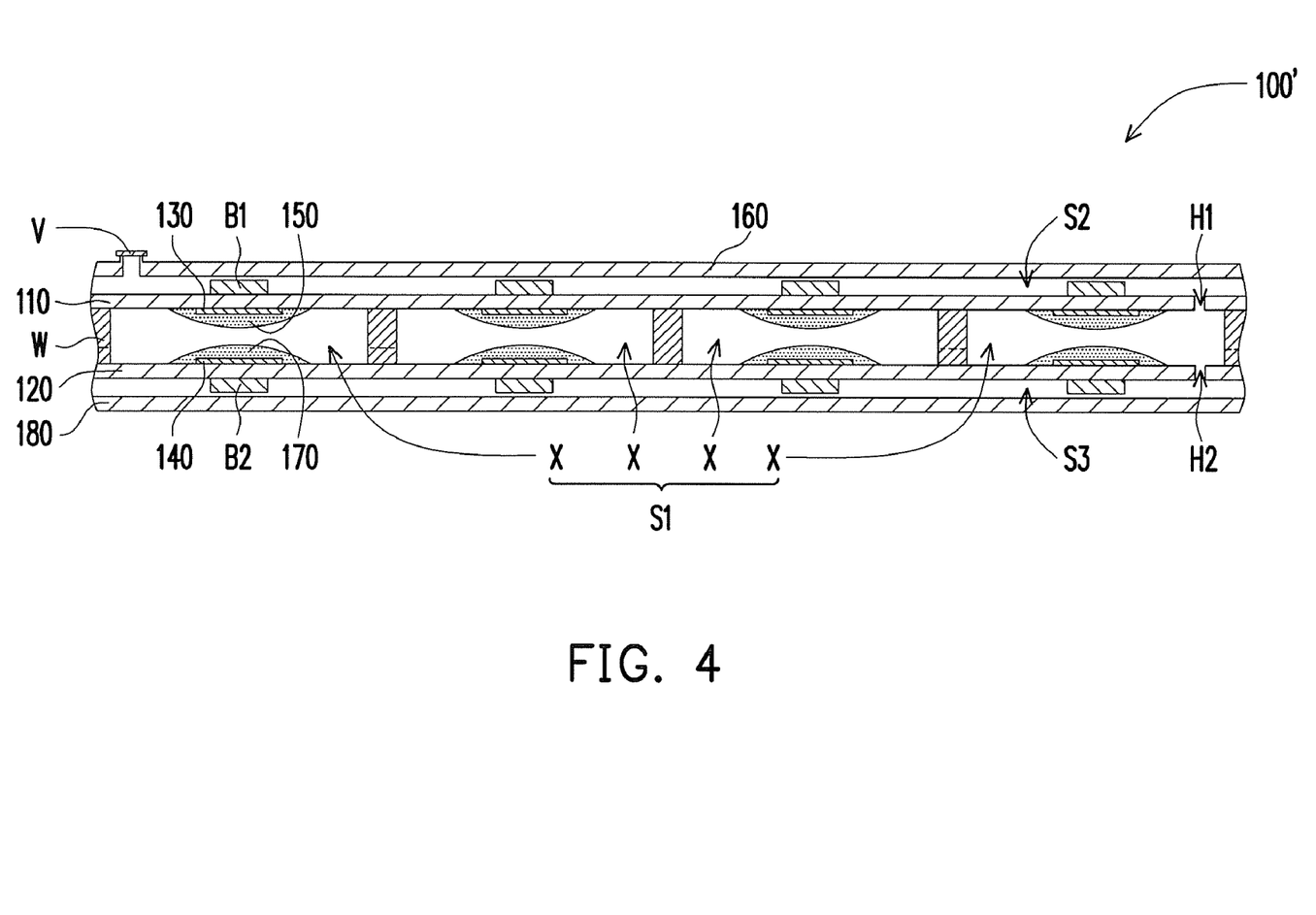
FIG. 4 is a cross-sectional view of a pressure device of flexible electronics in accordance with another embodiment.

FIG. 4 is a cross-sectional view of a pressure device of flexible electronics according to another embodiment of the present disclosure. Referring to FIG. 4, compared to the pressure device of flexible electronics 100 of FIG. 1, the pressure device of flexible electronics 100' of the present embodiment further includes a plurality of second sensing blocks 170 respectively disposed on the second electrodes 140. The second sensing blocks 170 are respectively isolated from the corresponding first sensing blocks 150. The material of the second sensing blocks 170 is, for example, a resistive material, a piezoresistive material, a piezoelectric material, an inductive material, an electromagnetic material or a thermoelectric material, which is used for sensing the pressure to correspondingly generate the sensing signal.

Compared to the pressure device of flexible electronics 100 of FIG. 1, the pressure device of flexible electronics 100' of the present embodiment further includes a fourth flexible film 180 and a plurality of second bumps B2. The fourth flexible film 180 is disposed with an interval under the second flexible film 120, and a third space S3 is formed between the fourth flexible film 180 and the second flexible film 120. The gap in the first space S1 and the third space S3 maintains a buffer distance between the second flexible film 120 and the first flexible film 110. The second bumps B2 respectively correspond to the first sensing blocks 150 and are disposed on the second flexible film 120, and are located between the second flexible film 120 and the fourth flexible film 180.

The first space S1, the second space S2 and the third space S3 are connected by the first through hole H1 and a second through hole H2 respectively disposed on the first flexible film 110 and the second flexible film 120 to form a confined space, wherein an internal air pressure thereof is substantially greater than one atmospheric pressure. Moreover, the first flexible film 110, for example, has a plurality of through holes (not shown) for connecting the first space S1 and the second space S2, so that the air pressures in the first space S1 and the second space S2 are more balanced.

An outer structure formed by the third flexible film 160 and the fourth flexible film 180 has a valve V. The air can be filled into the confined space formed by the first space S1, the second space S2 and the third space S3 via the valve V, so as to maintain the buffer distances among various components within the pressure device of flexible electronics 100'. The valve V can be a one-way valve or a two-way valve.

Figure 5:
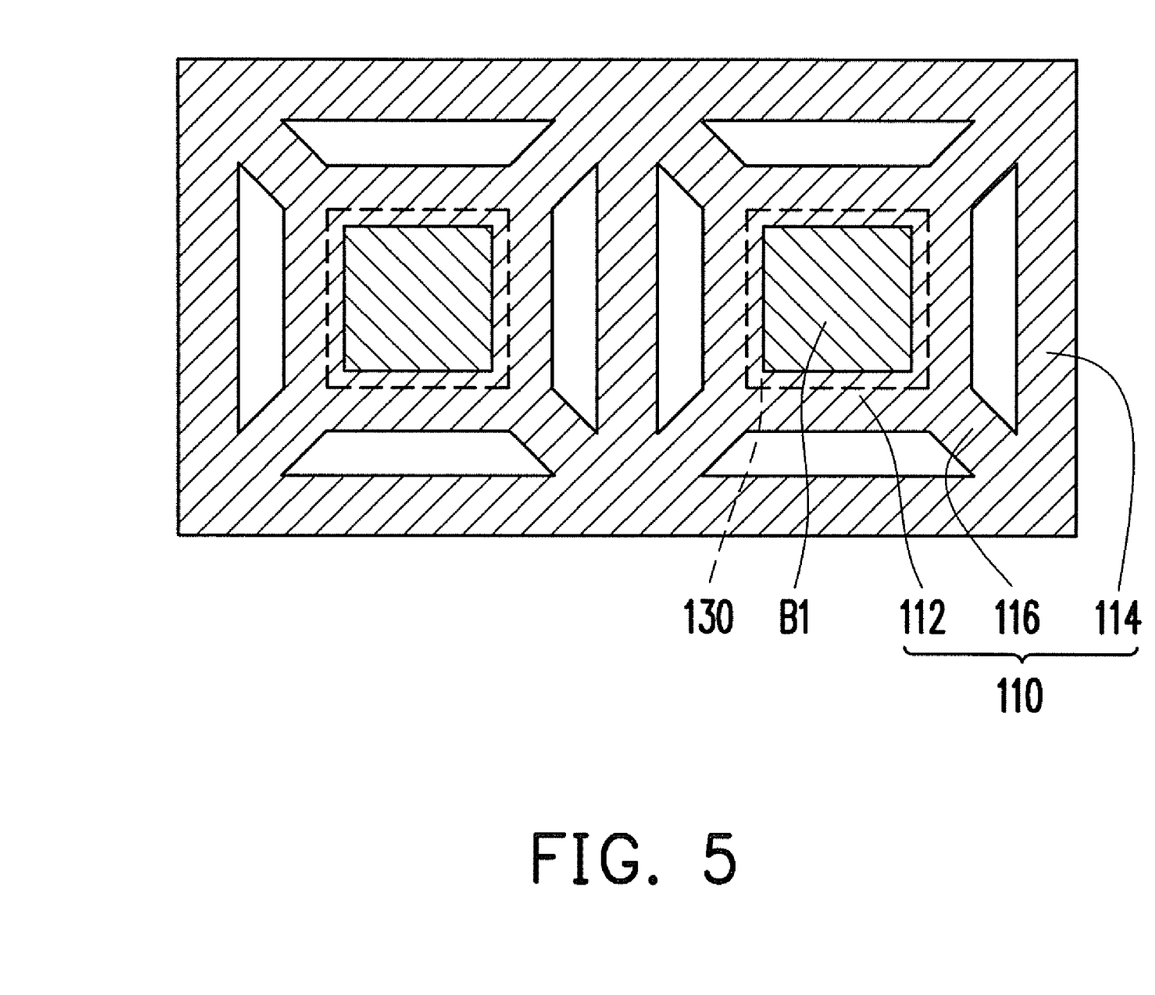
FIG. 5 is a top view of a part of structures of a pressure device of flexible electronics in accordance with still another embodiment.

FIG. 5 is a top view of a part of structures of a pressure device of flexible electronics according to still another embodiment of the present disclosure. Referring to FIG. 5, compared to the flexible electronic pressure devices 100 and 100' of the aforementioned embodiments, the first flexible film 110 of the present embodiment includes a plurality of central parts 112, a frame edge part 114 and a plurality of elastic parts 116 respectively located between the central parts 112 and the frame edge part 114, and the first electrodes 130 and the first bumps B1 are all respectively located on the central parts 112.

According to the above structure, after an external force is applied, the first flexible film 110 may have a relatively great deformation amount, so that the sensing sensitivity can be improved. Moreover, the elastic parts 116 are, for example, bar-like or spring-like.

In another embodiment that is not illustrated, the first space S1, the second space S2 and the third space S3 are respectively a confined space, and internal air pressures thereof are substantially greater than one atmospheric pressure. It should be noted that if the pressure device of flexible electronics 100' has a plurality of the non-connected confined spaces, it may have a plurality of corresponding valves V for filling the air into the confined spaces respectively.

In summary, in the pressure device of flexible electronics of the present disclosure, the air filled in the confined space maintains a buffer distance between the films. When the pressure device of flexible electronics is deformed, generation of the erroneous signals due to contact of the sensing block and the electrode or the two sensing blocks disposed on the different flexible films can be avoided. The bumps disposed on the film may lead to a fact that the film has a relatively great deformation amount due to an effect of stress concentration after an external force is applied, so as to improve a sensing sensitivity.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A pressure device of flexible electronics, comprising:
 a first flexible film;
 a second flexible film, disposed with an interval under the first flexible film, wherein a first space is formed between the second flexible film and the first flexible film;
 a plurality of first electrodes, disposed on the first flexible film in an array, and located between the first flexible film and the second flexible film;
 a plurality of second electrodes, disposed on the second flexible film in an array, and located between the first flexible film and the second flexible film;
 a plurality of first sensing blocks, respectively disposed on the first electrodes and respectively isolated from the corresponding second electrodes;
 a third flexible film, disposed with an interval above the first flexible film, and located farther from the second flexible film compared to that of the first flexible film, wherein a second space is formed between the third flexible film and the first flexible film, and air in the first space and the second space maintains a distance between the first flexible film and the second flexible film; and
 a plurality of first bumps, respectively corresponding to the first sensing blocks, and disposed on the first flexible film, and located between the first flexible film and the third flexible film.

2. The pressure device of flexible electronics as claimed in claim 1, wherein material of the first sensing block is a resistive material, a piezoresistive material, a piezoelectric material, an inductive material, an electromagnetic material or a thermoelectric material.

3. The pressure device of flexible electronics as claimed in claim 1 further comprises:
 a plurality of second sensing blocks, respectively disposed on the second electrodes, and respectively isolated from the corresponding first sensing blocks.

4. The pressure device of flexible electronics as claimed in claim 3, wherein material of the second sensing block is a resistive material, a piezoresistive material, a piezoelectric material, an inductive material, an electromagnetic material or a thermoelectric material.

5. The pressure device of flexible electronics as claimed in claim 1 further comprises:
a plurality of walls, disposed between the first flexible films and the second flexible films, and located between each two adjacent first sensing blocks.

6. The pressure device of flexible electronics as claimed in claim 5, wherein the walls separate the first space into a plurality of sub spaces.

7. The pressure device of flexible electronics as claimed in claim 6, wherein the sub spaces are mutually connected or independent.

8. The pressure device of flexible electronics as claimed in claim 1, wherein the first space and the second space are mutually connected.

9. The pressure device of flexible electronics as claimed in claim 1, wherein an outer structure formed by the second flexible film and the third flexible film comprises a one-way valve or a two-way valve.

10. The pressure device of flexible electronics as claimed in claim 1, wherein the first space and second space form a confined space, and an internal air pressure thereof is substantially greater than one atmospheric pressure.

11. The pressure device of flexible electronics as claimed in claim 1 further comprises:
a fourth flexible film, disposed with an interval under the second flexible film, wherein a third space is formed between the fourth flexible film and the second flexible film, and air in the first space and the third space maintains a distance between the second flexible film and the first flexible film; and
a plurality of second bumps, respectively corresponding to the first sensing blocks, and disposed on the second flexible film, and located between the second flexible film and the fourth flexible film.

12. The pressure device of flexible electronics as claimed in claim 11, wherein the first space and the third space are mutually connected or independent.

13. The pressure device of flexible electronics as claimed in claim 11, wherein an outer structure formed by the third flexible film and the fourth flexible film has a one-way valve or a two-way valve.

14. The pressure device of flexible electronics as claimed in claim 11, wherein the first space, the second space and the third space form a confined space, and an internal air pressure thereof is substantially greater than one atmospheric pressure.

15. The pressure device of flexible electronics as claimed in claim 1, wherein the first flexible film has at least one through hole for connecting the first space and the second space.

16. The pressure device of flexible electronics as claimed in claim 1, wherein the first flexible film forms a frame edge part, a plurality of central parts and a plurality of elastic parts respectively located between the central parts and the frame edge part, and the first electrodes are respectively located on the central parts.

17. A method for fabricating a pressure device of flexible electronics, comprising:
forming a plurality of first electrodes, a plurality of first sensing blocks and a plurality of first bumps on a first flexible film using a printing process, wherein the first electrodes are located on one side of the first flexible film, the first sensing blocks are respectively disposed on the first electrodes, and the first bumps respectively correspond to the first sensing blocks and are located on another side of the first flexible film;
forming a plurality of second electrodes and a plurality of walls on a second flexible film;
combining the walls to the first flexible film, so that the first flexible film and the second flexible film defines a first space, wherein the first electrodes, the second electrodes and the first sensing blocks are all located in the first space; and
assembling a third flexible film and the first flexible film to the second flexible film, so that the first flexible film and the third flexible film defines a second space, wherein the first bumps are located in the second space.

18. The method for fabricating a pressure device of flexible electronics as claimed in claim 17, wherein the printing process includes screen printing, inkjet printing, laminating, silk printing, or dispensing.

19. The method for fabricating a pressure device of flexible electronics as claimed in claim 17, wherein the step of forming the second electrodes and the walls on the second flexible film using another printing process includes screen printing, inkjet printing, laminating, silk printing, or dispensing.

20. The method for fabricating a flexible electronic pressure sensing device as claimed in claim 19, wherein the third flexible film comprises a valve.

* * * * *